(12) United States Patent
Taniguchi

(10) Patent No.: US 7,071,656 B2
(45) Date of Patent: Jul. 4, 2006

(54) TORQUE COMPUTATION UNIT FOR VEHICLE GENERATOR

(75) Inventor: Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 116 days.

(21) Appl. No.: 10/759,156

(22) Filed: Jan. 20, 2004

(65) Prior Publication Data

US 2004/0145355 A1    Jul. 29, 2004

(30) Foreign Application Priority Data

Jan. 29, 2003    (JP)    ............................. 2003-020502

(51) Int. Cl.
*H02H 7/06*    (2006.01)
*H02P 11/00*   (2006.01)
*H02P 9/00*    (2006.01)

(52) U.S. Cl. ............................. 322/28; 322/29; 322/24

(58) Field of Classification Search .................. 322/19, 322/20, 29, 24, 26, 28; 290/54
See application file for complete search history.

(56) References Cited

U.S. PATENT DOCUMENTS

| | | | |
|---|---|---|---|
| 3,887,855 A | * | 6/1975 | Klimo ......................... 388/807 |
| 4,019,104 A | * | 4/1977 | Parker ......................... 318/832 |
| 4,169,372 A | | 10/1979 | Colwill et al. ............ 73/862.18 |
| 4,435,987 A | * | 3/1984 | Sugimoto ................. 73/862.17 |
| 4,754,212 A | * | 6/1988 | Mashino ....................... 322/28 |
| 4,977,508 A | * | 12/1990 | Tanaka et al. ............... 701/111 |
| 5,418,400 A | * | 5/1995 | Stockton ...................... 290/46 |
| 5,559,704 A | | 9/1996 | Vanek et al. ................... 701/99 |
| 5,666,917 A | | 9/1997 | Fraser et al. ........... 123/339.11 |
| 5,990,590 A | * | 11/1999 | Roesel et al. ............... 310/113 |
| 6,252,317 B1 | * | 6/2001 | Scheffer et al. ............... 310/46 |
| 6,456,048 B1 | * | 9/2002 | Taniguchi et al. ............ 322/28 |
| 6,700,400 B1 | * | 3/2004 | Atarashi ..................... 324/772 |
| 2002/0193922 A1 | * | 12/2002 | Taniguchi et al. ........... 701/29 |
| 2005/0140342 A1 | * | 6/2005 | Maehara et al. .............. 322/36 |

FOREIGN PATENT DOCUMENTS

| | | |
|---|---|---|
| EP | 1 193 825 A1 | 4/2002 |
| FR | 2 823 028 | 10/2002 |
| JP | 59 226680 A | 12/1984 |
| JP | A 62-254699 | 11/1987 |
| JP | A 8-240134 | 9/1996 |
| JP | A 10-4698 | 1/1998 |
| JP | A 10-210679 | 8/1998 |
| JP | B2 2855714 | 11/1998 |
| JP | A 2001-292501 | 10/2001 |

* cited by examiner

*Primary Examiner*—Julio C. Gonzalez
(74) *Attorney, Agent, or Firm*—Oliff & Berridge, PLC

(57) ABSTRACT

A torque computation unit of a vehicle generator includes a rotor, an armature winding, a field coil and a field current switching element. The torque computation unit includes a field current detecting circuit, an output current detecting circuit and a rotation speed detecting circuit, a torque calculation circuit for calculating driving torque of the generator from the field current, the output current and the rotation speed.

8 Claims, 4 Drawing Sheets

TORQUE COMPUTATION UNIT FOR VEHICLE GENERATOR

CROSS REFERENCE TO RELATED APPLICATION

The present application is based on and claims priority from Japanese Patent Application 2003-20502, filed Jan. 29, 2003, the contents of which are incorporated herein by reference.

BACKGROUND OF THE INVENTION

1. Field of the Invention

The present invention relates to a torque computation unit which calculates driving torque of a vehicle generator.

2. Description of the Related Art

Recently, a so called torque-based control has been adopted to control a vehicle engine so as to improve fuel economy. For this end, it has been found necessary to control belt driving torque for operating various accessories in addition to vehicle driving torque. Because a vehicle generator, which is one of the accessories, necessitates a high speed increasing ratio to drive, the driving torque control of the vehicle generator is given priority over other accessories.

In general, the vehicle generator is operated under a wide range of rotation speed and ambient temperature. Therefore, the driving torque is calculated by use of a torque map which provides data of duty ratios of field current supplied to a field coil of the vehicle generator relative to various temperatures, as disclosed in JP-A-Sho 62-254699, JP-A-Hei 8-240134 and JP-A-Hei 10-4698. The driving torque can be also calculated by use of an efficiency map which provides data of efficiencies relative to output power levels of a vehicle generator. In this case, the driving torque can be calculated from an efficiency that corresponds to a detected power level of the vehicle generator, as disclosed in JP-A-Hei 10-210679 and JP-A-2001-292501.

Thus, it is necessary to provide a large memory capacity to calculate the driving torque in the above prior arts. Further, it is necessary to provide different memories for different vehicles. This is not practical or economical in view of the production cost and productivity.

JP-B-2855714 disclose another prior art which uses a control map in which a control signal is selected from data memorized in the control map according to an engine rotation speed. However, it is difficult to accurately calculate the driving torque.

SUMMARY OF THE INVENTION

The present invention has been made in view of the above described problems, and has an object of providing a torque computation unit for a vehicle generator that can accurately calculate driving torque with a comparatively small memory size.

According to a main feature of the invention, a torque computation unit of a vehicle generator includes field current detecting means, output current detecting means, rotation speed detecting means and driving torque calculating means, in which the driving torque calculating means calculates driving torque of the generator from the field current value, the output current value and the rotation speed.

In the above constructed torque computation unit, it is preferable that the field current detecting means calculates the field current value from voltage applied to the field coil and an on-off ratio of the field current switching element. The field current switching element may be a MOSFET that has a function of detecting current flowing therethrough. A solenoid may be disposed around an end of the armature winding, wherein the output current detecting means calculates the output current value from voltage applied to the solenoid.

The above torque computation unit may includes a C-shaped magnetic core having a slit and a magnetic sensor inserted in the slit. In this case, the output current detecting means calculates the output current from an output signal of the magnetic sensor. The rotation speed detecting means may calculate the rotation speed from the basic frequency of voltage induced in the armature winding.

The above torque computation unit may include a memory which stores data of moment of inertia of the rotor and means for calculating an acceleration velocity of the rotation speed from voltage induced in the armature winding, so that the torque calculation means calculates inertial torque of the generator from the acceleration velocity and the moment of inertia of the rotor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle ac generator with a torque computation unit according to the first embodiment of the invention will be described with reference to FIGS. 1–7.

Figure 1:
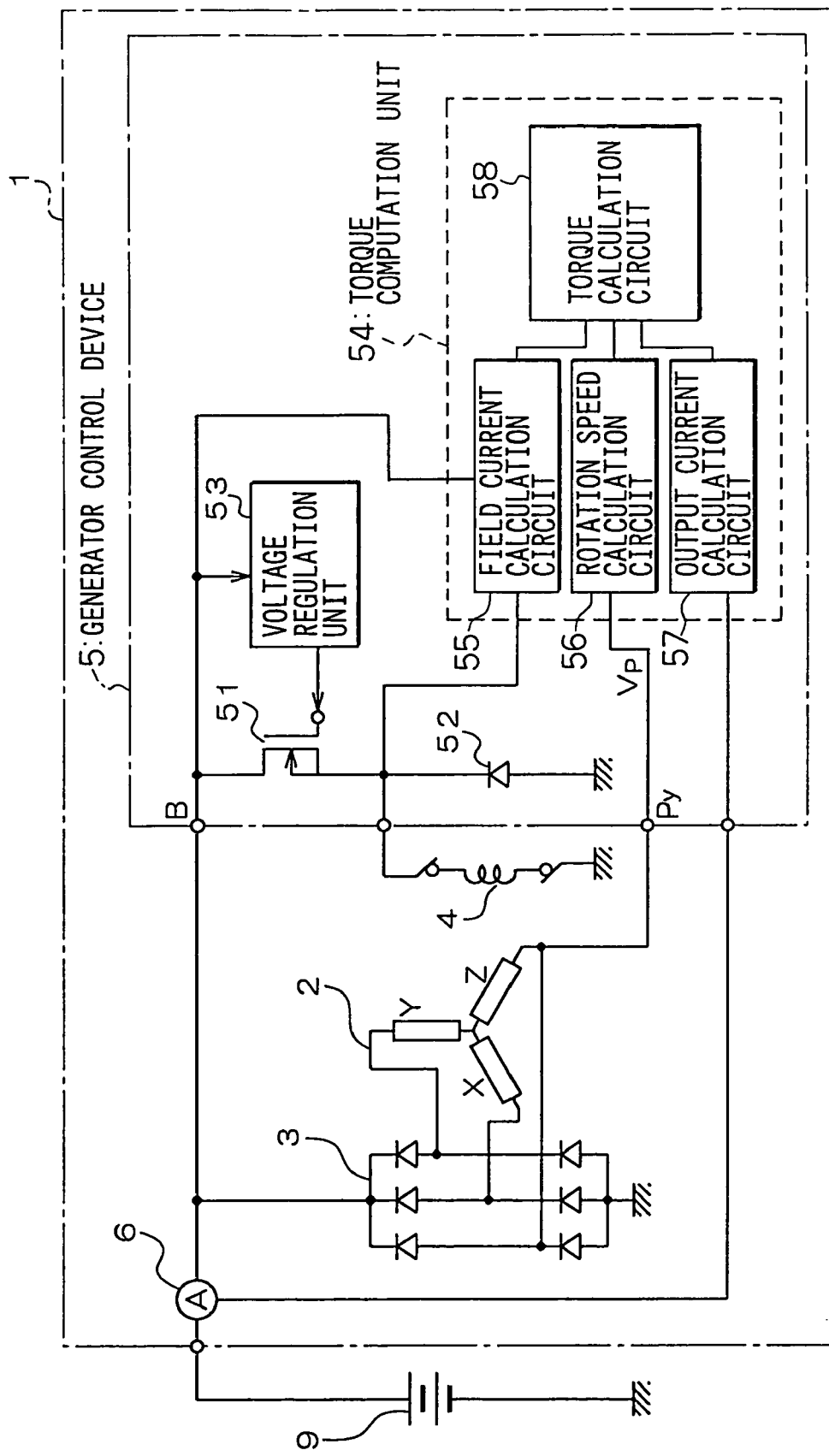
FIG. 1 is a block diagram illustrating a vehicle ac generator having a torque computation unit according to the first embodiment of the invention.

As shown in FIG. 1, a vehicle ac generator 1 includes an armature winding 2, a rectifying unit 3, a field coil 4, a generator control device 5 and a current sensor 6. The armature winding 2 is constituted of three phase windings which generate output voltages to be rectified by the rectifying unit 3. The field coil 4 generates a magnetic field when field current is supplied thereto. The generator control device 5 regulates the output voltage of the ac generator 1 to a predetermined regulation voltage Vreg. The generator control device 5 calculates driving torque of the ac generator from the field current, generator rotation speed and generator output current. The current sensor 6 detects the output current of the ac generator 1. The ac generator 1 has a B terminal to be connected to a vehicle battery 9.

The generator control device 5 includes a power transistor 51, a flywheel diode 52, a voltage regulating unit 53 and a torque computation unit 54. The power transistor 51 is connected in series to the field coil 4 to switch on and off the field current to be supplied to the field coil 4. The flywheel diode 52 is connected in parallel with the field coil 4 to circulate the field current through it from the field coil when the power transistor 51 is switched off. The voltage regulating unit 53 detects the voltage of the B terminal and controls the power transistor 51 to switch on and off so that the B terminal's voltage can be regulated to a predetermined regulation voltage Vreg. If the B terminal's voltage is higher than the regulation voltage Vreg, the voltage regulation unit 53 turns off the power transistor 51 to lower the generator's output voltage. On the other hand, the voltage regulator unit turns on the power transistor 51 to increase the generator's output voltage if the B terminal's voltage is lower than the regulation voltage Vreg.

The torque computation unit 54 includes a field current calculation circuit 55 for calculating field current, a rotation speed calculation circuit 56 for calculating engine rotation speed, an output current calculation circuit 57 and a torque calculation circuit 58.

Operation of the torque computation unit 54 will be described next.

Field Current Calculation

Figure 2:
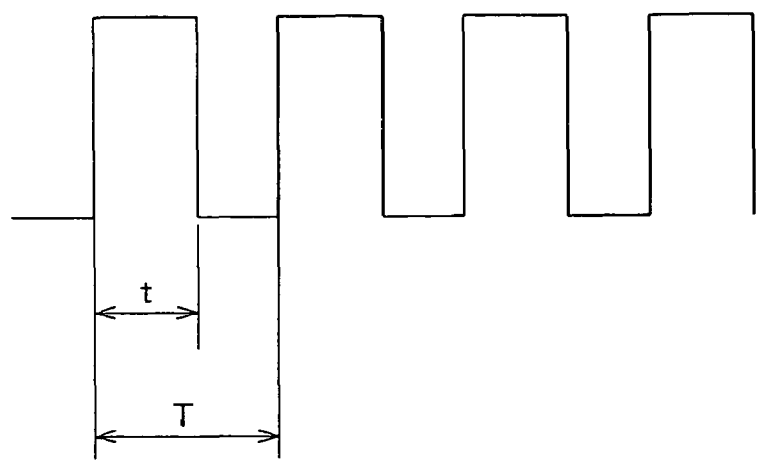
FIG. 2 is a graph showing a voltage wave of voltage at a junction of a power transistor and a field coil of the ac generator.

While the generator control device 5 controls the power transistor 51 to switch on and off the field current, a voltage wave that has a duty ratio t/T, as shown in FIG. 2, is detected at the junction of the power transistor 51 and the field coil 4. As shown in a graph in FIG. 3, the duty ratio is proportional to a field-current proportional value F of the field current supplied to the field coil 4. Therefore, the following expression can be given to the field current value Ir:

$$Ir = F \cdot Vr/Rf \quad (1),$$

where Vr is voltage applied to the field coil, and Rf is the resistance of the field coil 4.

Incidentally, Vr is approximately equal to or a little lower (by a voltage drop between the source and the drain of the power transistor 51) than the output voltage of the ac generator. Although the resistance Rf changes as the ambient temperature of the ac generator changes, an accurate value of the field current can be calculated by the following expression:

$$Rf = (kr + T1)/(Kr + To) \cdot Ro \quad (2),$$

where Kr is a constant value indicating a relationship between the temperature and the resistance, T1 is a current ambient temperature, To is a basic temperature, and Ro is the resistance of the field coil 4 at the basic temperature.

Figure 3:
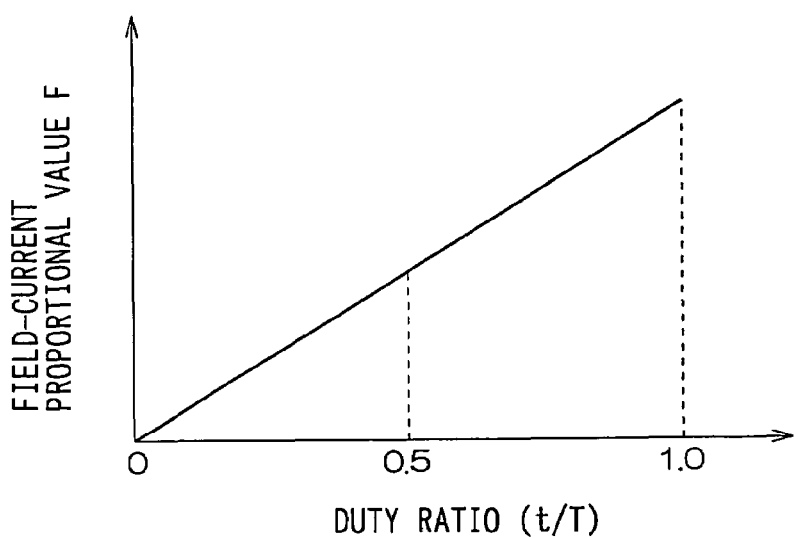
FIG. 3 is a graph showing a relationship between duty ratios of the voltage at the junction and field-current proportional values of field current supplied to the field coil.

The field current calculation circuit 55 calculates, according to the graph shown in FIG. 3, a field-current proportional value that corresponds to a duty ratio of a voltage signal detected at the junction of the power transistor 51 and the field coil 4. Thereafter, the field current calculation circuit 55 calculates the value Ir of the field current by use of the expressions (1) and (2).

Rotation Speed Calculation

Figure 4:
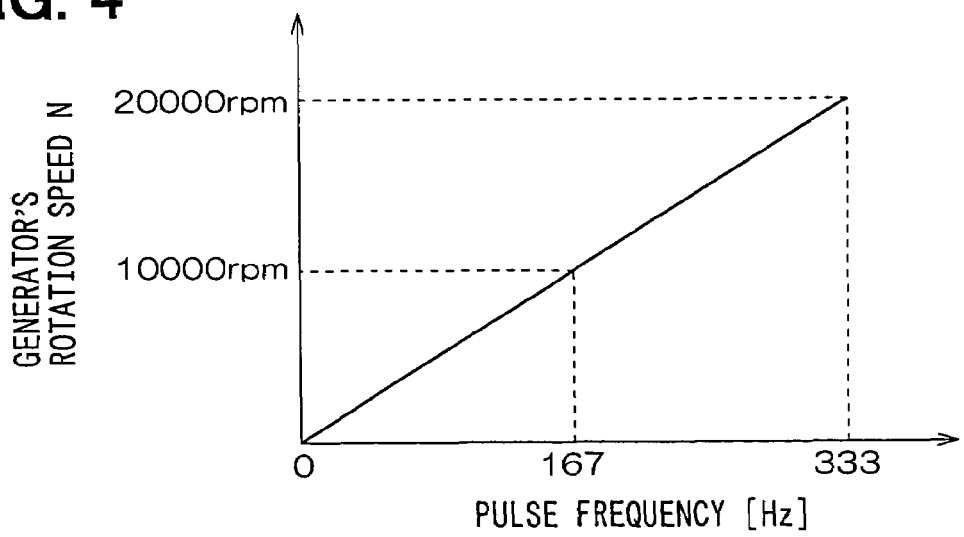
FIG. 4 is a graph showing a relationship between pulse frequencies of phase voltage generated in a phase winding of the ac generator and rotation speeds of the ac generator.

The rotation speed of the ac generator 1 is calculated from the frequency of phase voltage Vp induced in one phase winding of the armature winding 2. The phase voltage Vp has a duty ratio of 50% and a frequency that is proportional to the rotation speed of the ac generator. The rotation speed calculation circuit 56 converts the phase voltage Vp into a pulse signal that has a frequency proportional to the rotation speed of the ac generator as shown in FIG. 4. Incidentally, FIG. 4 exemplifies a pulse signal of an ac generator that has 12 magnetic poles (or six pairs of N-S poles).

Output Current Calculation

Figure 5:
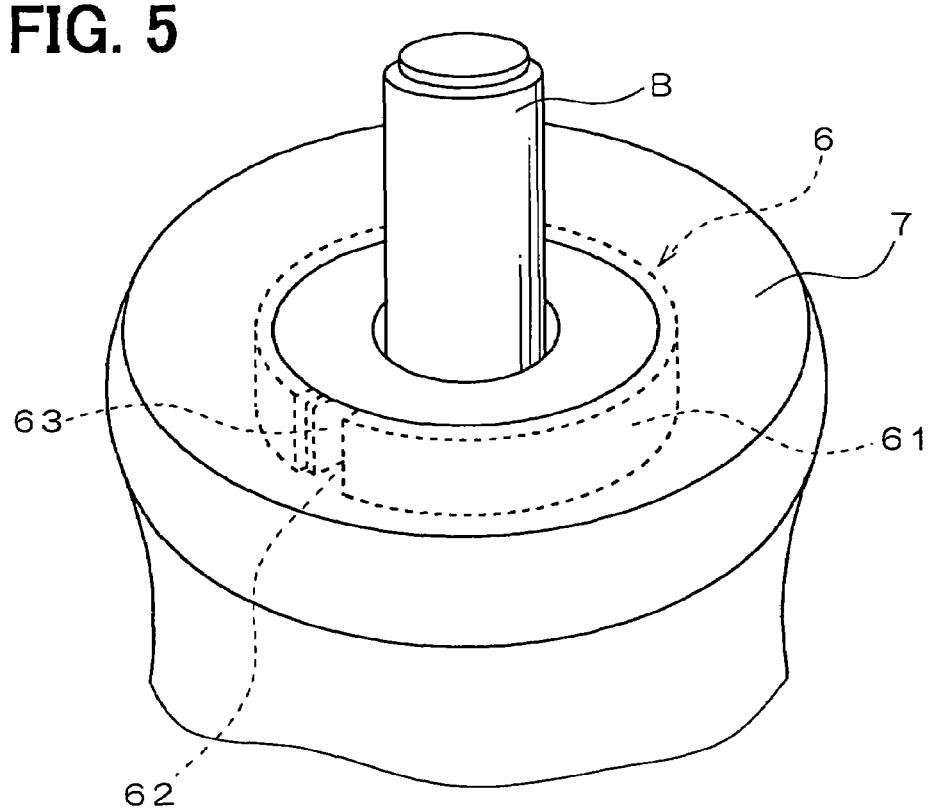
FIG. 5 is a perspective view of a portion of the ac generator around a B terminal.
Figure 6:
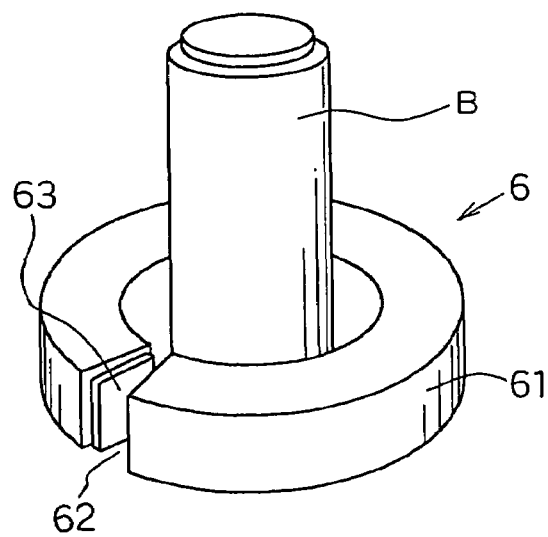
FIG. 6 is a perspective view of a current sensor disposed around the B terminal.

As shown in FIGS. 5 and 6, the B-terminal is insulated by an insulating bush 7 from a frame of the ac generator and other portions thereof. The insulating bush 7 includes an insert-molded C-shaped magnetic core 61 having a slit 62 and a magnetic sensor 63 that is inserted into the slit 62. The C-shaped magnetic core 61 is made of soft magnetic material, such as 78-permalloy, so as to collect magnetic flux when output current flows through the B terminal. The magnetic sensor 63 is made of a hall element, a magnetoresistance element or a magnetoimpedance element and provides an electric signal when it detects magnetic flux. Thus, it is easy to install the magnetic sensor into the ac generator.

The output current calculation circuit 57 receives the electric signal from the magnetic sensor 63 and calculates the output current Io of the ac generator 1.

Generator Driving Torque Calculation

After the value Ir of the field current is calculated, the rotation speed N and a value Io of the output current are calculated, the driving torque T is calculated by use of the following expression:

$$T = (k1 \cdot Ir^2 + M \cdot Ir \cdot Io + k2 \cdot Io^2)/N \quad (3),$$

where k1 is a constant relating to the self-inductance of the field winding 4, M a constant relating to the mutual inductance between the field coil 4 and the armature winding 2, and k2 is a constant relating to the self-inductance of the armature winding 2.

Because the rotation speed N, the value Ir of the field current, the value Io of the output current are calculated at a real-time base, it is only necessary for the memory of the torque computation unit 53 to store data of k1, k2 and M.

The torque calculation circuit 58 calculates the driving torque from the value If of the field current, the rotation speed N, the value Io of the output current that are respectively provided by the field current calculation circuit 55, the rotation speed calculation circuit 56 and the output current calculation circuit 57 and from the three constants k1, k2 and M that are read from the memory of the torque computation unit 54, by use of the expression (3).

Thus, the memory size of the map can be much reduced. The above calculation may not be affected by DC magnetic saturation of the magnetic circuit.

The amount Ir of the field current can be detected in a different way.

Figure 7:
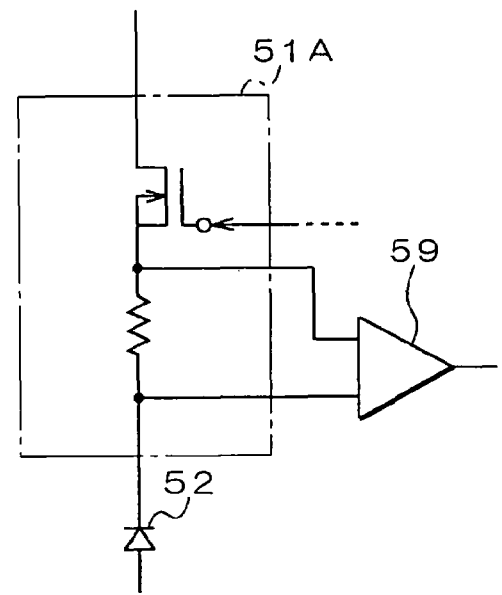
FIG. 7 is a circuit diagram of a modified current detecting circuit.

For example, a current detecting resistor is connected in series with the field coil so as to detect a voltage drop across the current detecting resistor, as shown in FIG. 7. In this case, the power transistor 51 is replaced by a MOSFET 51A which includes a series-connected internal resistor. The voltage drop across the internal resistor is amplified by an amplifier 59. The torque calculation circuit 58 receives the output signal of the amplifier 59 and calculates the value Ir of the field current.

A magnetic solenoid wound on a cylindrical magnetic core can be also adopted to detect an amount Io of the output current. In this case, a portion of the conductor between the armature winding 2 and the rectifying unit 3 is inserted into the cylindrical magnetic core to detect magnetic flux generated by the output current. The cylindrical magnetic core should have a sufficient sectional area to pass the maximum magnetic flux without saturation.

In case that the armature winding is a three-phase symmetric winding, the relationship between the value Idc of the output current (dc) and the amplitude Ip of the phase current is expressed as follows.

$$Idc=0.955 \cdot Ip$$

The above way of detection can reduce an error caused by a temperature change.

The inertial torque T2 of the ac generator 1 can be calculated from the acceleration velocity N' of the rotation by use of the following expression if data of the moment of inertia J are stored in a memory.

$$T2=J \cdot N'$$

Therefore, the total torque Ttot of the ac generator can be given by summing up the driving torque T and the inertial torque. Engine control by use of the total torque Ttot is effective to stabilize the engine rotation.

It is possible to make an engine control unit carry out total torque control. In this case, data of the field current, the output current and the rotation speed are transmitted to the engine control unit via a serial communication protocol (e.g. Controller Area Network). This system may reduce communication errors and communication delay.

A vehicle ac generator with a torque computation unit according to the second embodiment of the invention will be described with reference to FIG. 8, wherein the same reference numeral as the first embodiment represents the same or substantially the same portion, part or component of the first embodiment.

Figure 8:
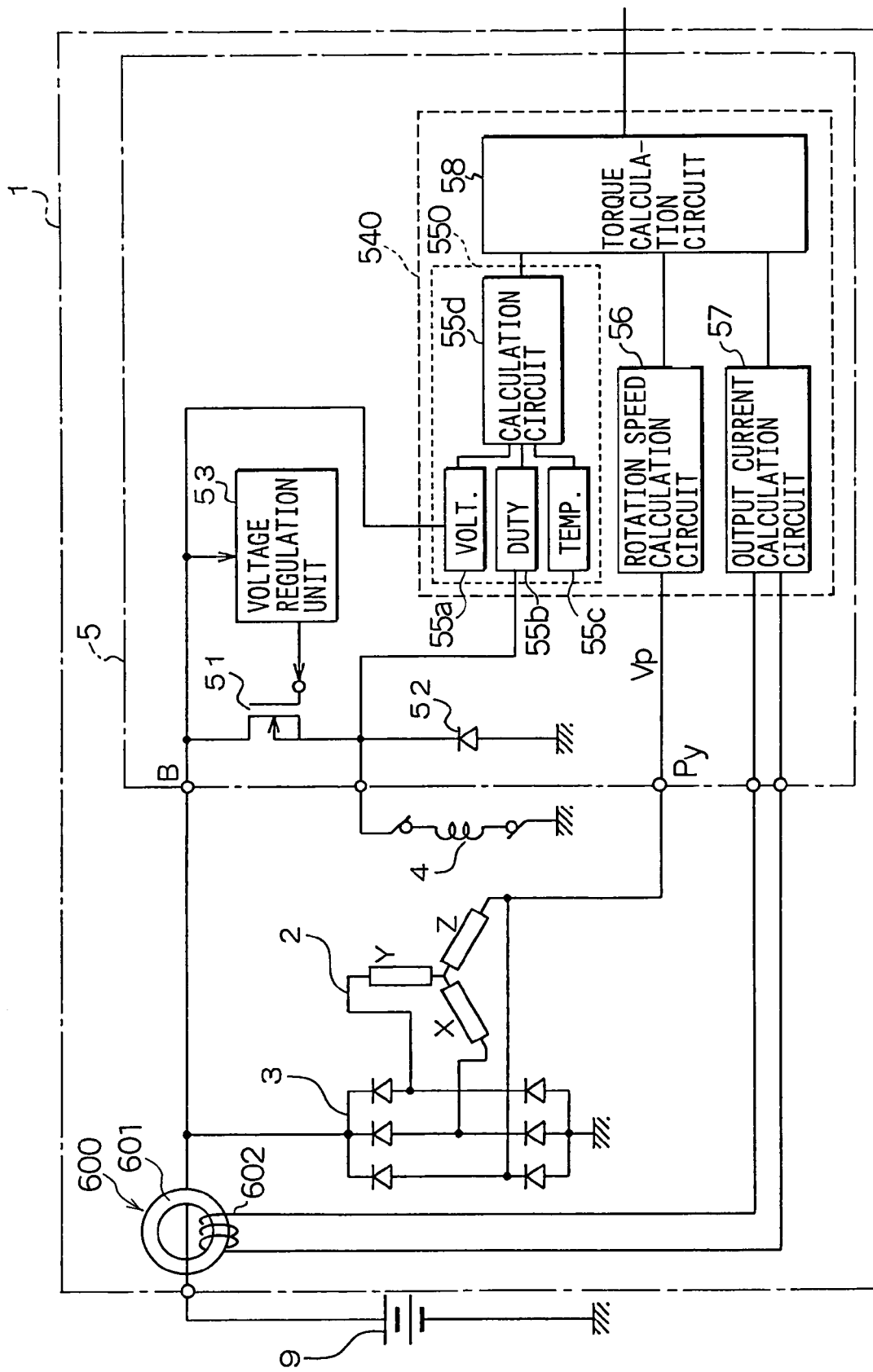
FIG. 8 is a block diagram illustrating a vehicle ac generator having a torque computation unit according to the second embodiment of the invention.

As shown in FIG. 8, a vehicle ac generator 1 includes an armature winding 2, a rectifying unit 3, a field coil 4, a generator control device 5 and a current sensor 600. The current sensor 600 includes a ring-shaped core 601 and a detecting coil 602 wound around the core, and is disposed at a power line between the ac generator 1 and the battery 9, or around the output terminal of the armature winding 2. Therefore, the detecting coil 602 provides a signal voltage that relates to the current flowing through the power line or the output terminal to be detected, and the signal voltage is inputted to the output calculation circuit 57.

The generator control device 5 includes a power transistor 51, a flywheel diode 52, a voltage regulating unit 53 and a torque computation unit 540. The torque computation unit 540 includes a field current calculation circuit 550 for calculating field current, a rotation speed calculation circuit 56 for calculating engine rotation speed, an output current calculation circuit 57 and a torque calculation circuit 58.

The field current calculation circuit 550 calculates voltage to be applied to the field coil 4, a duty ratio of the current supplied to the field coil 4 and an amount of the current supplied to the field coil 4 that changes according to an ambient temperature. The field current calculation circuit 550 includes a voltage detecting circuit 55a, a duty ratio detecting circuit 55b, a temperature detecting circuit 55c and a calculation circuit 55d.

The voltage detecting circuit 55a detects voltage applied to the field coil 4 from the output voltage of the generator. The duty ratio detecting circuit 55b detects a duty ratio of the field current. The temperature detecting circuit 55c includes a temperature sensor and a calculation circuit to directly or indirectly detect the temperature of the field coil 4. The calculation circuit 55d calculate an amount of the current supplied to the field coil 4.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims.

What is claimed is:

1. A torque computation unit of a vehicle generator that includes a rotor, an armature winding, a field coil and a field current switching element, the torque computation unit comprising:
    field current detecting means for detecting a field current value relating to current supplied to the field coil;
    output current detecting means for detecting an output current value relating to output current of the armature winding;
    rotation speed detecting means for detecting a rotation speed of the rotor; and
    torque calculation means for calculating driving torque of the generator from the field current value, the output current value and the rotation speed,
    wherein said field current detecting means calculates the field current value from voltage applied to the field coil and an on-off ratio of the field current switching element.

2. The torque computation unit according to claim 1, wherein said field current switching element is a MOSFET.

3. The torque computation unit according to claim 1, wherein said rotation speed detecting means calculates the rotation speed from the basic frequency of voltage induced in said armature winding.

4. A torque computation unit of a vehicle generator that includes a rotor, an armature winding, a field coil and a field current switching element, the torque computation unit comprising:
    field current detecting means for detecting a field current value relating to current supplied to the field coil;
    output current detecting means for detecting an output current value relating to output current of the armature winding;
    rotation speed detecting means for detecting a rotation speed of the rotor;
    torque calculation means for calculating driving torque of the generator from the field current value, the output current value and the rotation speed; and
    a solenoid disposed around an end of the armature winding,
    wherein said output current detecting means calculates the output current value from voltage applied to the solenoid.

5. A torque computation unit of a vehicle generator that includes a rotor, an armature winding, a field coil and a field current switching element, the torque computation unit comprising:
    field current detecting means for detecting a field current value relating to current supplied to the field coil;
    output current detecting means for detecting an output current value relating to output current of the armature winding;
    rotation speed detecting means for detecting a rotation speed of the rotor;
    torque calculation means for calculating driving torque of the generator from the field current value, the output current value and the rotation speed; and a C-shaped magnetic core having a slit and a magnetic sensor inserted in the slit, wherein said output current detecting means calculates the output current value from an output signal of said magnetic sensor.

6. A torque computation unit of a vehicle generator that includes a rotor, an armature winding, a field coil and a field current switching element, the torque computation unit comprising:

field current detecting means for detecting a field current value relating to current supplied to the field coil;

output current detecting means for detecting an output current value relating to output current of the armature winding;

rotation speed detecting means for detecting a rotation speed of the rotor;

torque calculation means for calculating driving torque of the generator from the field current value, the output current value and the rotation speed;

a memory which stores data of moment of inertia of the rotor; and means for calculating an acceleration velocity of the rotation speed from voltage induced in the armature winding, wherein said torque calculation means calculates inertial torque of the generator from the acceleration velocity and the moment of inertia of the rotor.

7. A torque computation unit of a vehicle generator that includes a rotor, an armature winding, a field coil and a field current switching element, the torque computation unit comprising:

field current detecting means for detecting a field current value relating to current supplied to the field coil;

output current detecting means for detecting an output current value relating to output current of the armature winding;

rotation speed detecting means for detecting a rotation speed of the rotor;

torque calculation means for calculating driving torque of the generator from the field current value, the output current value and the rotation speed, wherein said field current detecting means further comprises means for detecting temperature of the field coil, and wherein said field current detecting means calculates the field current value from voltage applied to the field coil, an on-off ratio of the field current switching element and the temperature of the field coil.

8. A torque computation unit of a vehicle generator that includes a rotor, an armature winding, a field coil and a field current switching element, the torque computation unit comprising:

field current detecting means for detecting a field current value Ir;

output current detecting means for detecting an output current value Io of the armature winding;

rotation speed detecting means for detecting a rotation speed N of the rotor; and torque calculation means for calculating driving torque T of the generator from the field current value Ir, the output current value Io, and the rotation speed N from the following equation:

$$T=(k1 \cdot Ir^2 + M \cdot Ir \cdot Io + k2 \cdot Io^2)/N,$$

wherein k1 is a constant relating to a self-inductance of said field coil, M is a constant relating to a mutual inductance between said field coil and said armature winding and k2 is a constant relating to a self-inductance of said armature.

* * * * *